United States Patent
Shestak et al.

(10) Patent No.: US 8,488,090 B2
(45) Date of Patent: Jul. 16, 2013

(54) BACKLIGHT UNIT AND DISPLAY APPARATUS EMPLOYING THE SAME

(75) Inventors: Sergey Shestak, Suwon-si (KR); Kyung-hoon Cha, Yongin-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 95 days.

(21) Appl. No.: 13/272,345

(22) Filed: Oct. 13, 2011

(65) Prior Publication Data
US 2012/0092590 A1 Apr. 19, 2012

(30) Foreign Application Priority Data

Oct. 13, 2010 (KR) .................. 10-2010-0099841

(51) Int. Cl.
*G02F 1/1335* (2006.01)
(52) U.S. Cl.
USPC .......................................... 349/117; 349/201
(58) Field of Classification Search
USPC .................................. 349/117, 201
See application file for complete search history.

(56) References Cited

U.S. PATENT DOCUMENTS 8,300,512 B2* 10/2012 Tao et al. ................. 369/112.02
2005/0030450 A1* 2/2005 Okamoto et al. ............. 349/113

* cited by examiner

*Primary Examiner* — Lucy Chien
(74) *Attorney, Agent, or Firm* — Sughrue Mion, PLLC

(57) ABSTRACT

A backlight unit including a light source; and a liquid crystal panel. The liquid crystal panel includes a first substrate which guides light incident from the light source disposed at at least one side of the first substrate; a transparent electrode disposed on a surface of the first substrate; a second substrate; a reflective electrode disposed on a surface of the second substrate facing the transparent electrode; a liquid crystal layer disposed between the transparent electrode and the reflective electrodes; and a transparent film disposed between the transparent electrode and the reflective electrodes, the transparent film including a surface contacting the liquid crystal layer and patterned with grooves or ribs, and having a refractive index corresponding to at least one of an ordinary refractive index and an extraordinary refractive index of liquid crystals of the liquid crystal layer.

20 Claims, 5 Drawing Sheets

BACKLIGHT UNIT AND DISPLAY APPARATUS EMPLOYING THE SAME

CROSS-REFERENCE TO RELATED PATENT APPLICATION

This application claims priority from Korean Patent Application No. 10-2010-0099841, filed on Oct. 13, 2010 in the Korean Intellectual Property Office, the disclosure of which is incorporated herein in its entirety by reference.

BACKGROUND

1. Field

Apparatuses consistent with exemplary embodiments generally relate to a backlight unit and a display apparatus employing the same.

2. Description of the Related Art

A general reconfigurable backlight unit used to produce local dimming includes a two-dimensional (2D) array of light-emitting diodes (LEDs), and a diffuse sheet. The general reconfigurable backlight unit may be controlled by individually driving the LEDs. A backlight unit of a liquid crystal display apparatus for performing local dimming should generate an accurately controllable light pattern for backlighting a liquid crystal panel when a high-contrast image is displayed, and should provide uniform illumination for a low-contrast image. However, since an area of an image panel of the liquid crystal display apparatus, which is illuminated by each LED, overlaps an area corresponding to another LED, accurate control of the backlight unit is not easy.

Also, a reconfigurable backlight unit acts as a generator of vertical or inclined light stripes to provide selective visions of different views displayed on a liquid crystal display panel by alternating columns, and may be employed in a 2D/three-dimensional (3D) switchable autostereoscopic display apparatus.

A general backlight unit may include an array of sets of red (R), green (G), and blue (B) LEDS aligned at equal intervals on a backlight unit covered by a diffuser.

Due to high cost, the number of LEDs in a backlight unit is not generally large and thus each LED is mounted together with an optical lens having a shape for spreading light emitted from the LED to a wide area on the diffuser. In order to provide uniform illumination, footprints of light beams generated by different LEDs overlap each other. As a result, a pattern generated by the backlight is reduced in resolution and thus is blurred. The blur requires additional image processing to be performed in a display apparatus for realizing local dimming.

SUMMARY

Exemplary embodiments provide a reconfigurable backlight unit capable of accurately controlling a light pattern and uniform illumination, and a display apparatus employing the same.

According to an aspect of an exemplary embodiment, there is provided a backlight unit including a light source; and a liquid crystal panel for electrically controlling a liquid crystal grating and forming a desired light pattern by using light incident from the light source, wherein the liquid crystal panel includes a first substrate used as a light guide plate for guiding light incident from the light source disposed at at least one side of the first substrate, including a transparent electrode formed on one surface of the first substrate, and being transparent; a second substrate including a reflective electrode on a surface of the second substrate facing the transparent electrode of the first substrate; a liquid crystal layer defined between the first and second substrates; and a transparent film disposed on one of the first and second substrates to contact the liquid crystal layer, including a surface contacting the liquid crystal layer and patterned with grooves or ribs extending in parallel with a direction in which the light source extends, and having a refractive index corresponding to at least one of an ordinary refractive index and an extraordinary refractive index of liquid crystals of the liquid crystal layer, wherein the liquid crystal layer and the transparent film form the liquid crystal grating according to whether refractive indices of the liquid crystal layer and the transparent film match based on whether a voltage is applied between the transparent electrode and the reflective electrode, and wherein the liquid crystal grating is electrically controlled to form the desired light pattern.

The transparent film may be bonded onto the transparent electrode.

The first substrate may have a uniform thickness, or may be a wedge-type substrate having a gradually increasing or decreasing thickness.

The transparent film may include a transparent birefringent material having an ordinary refractive index and an extraordinary refractive index corresponding to the ordinary refractive index and the extraordinary refractive index of the liquid crystals of the liquid crystal layer.

The transparent film may include a polymerized liquid crystal film.

The transparent film may include an isotropic material having a refractive index corresponding to one of the ordinary refractive index and the extraordinary refractive index of the liquid crystals of the liquid crystal layer.

The transparent film may include a material including polymethylmethacrylate (PMMA) or polycarbonate.

The backlight unit may further include a transparent optical retarding film formed on the reflective electrode.

The backlight unit may further include a diffuser at a side of a light-emitting surface of the liquid crystal panel.

One of the transparent electrode and the reflective electrode may be in the form of horizontally aligned stripes so as to be used as an address electrode, and the other of the transparent electrode and the reflective electrode may be used as a common electrode, thereby generating backlight scanning.

One of the transparent electrode and the reflective electrode may be in the form of a 2D array so as to perform addressing individually or by using a matrix method, and the other of the transparent electrode and the reflective electrode may be used as a common electrode, thereby generating local dimming.

One of the transparent electrode and the reflective electrode may be split in one direction, and the other of the transparent electrode and the reflective electrode may be split in a direction crossing the one of the transparent electrode and the reflective electrode, thereby switching illumination lines to generate a backlight for a 2D/3D switchable display apparatus.

According to an aspect of another exemplary embodiments, there is provided a display apparatus including the above backlight unit; and a display panel for forming an image by using light emitted from the backlight unit.

BRIEF DESCRIPTION OF THE DRAWINGS

The above and other aspects will become more apparent by describing in detail exemplary embodiments with reference to the attached drawings in which.

Figure 1:
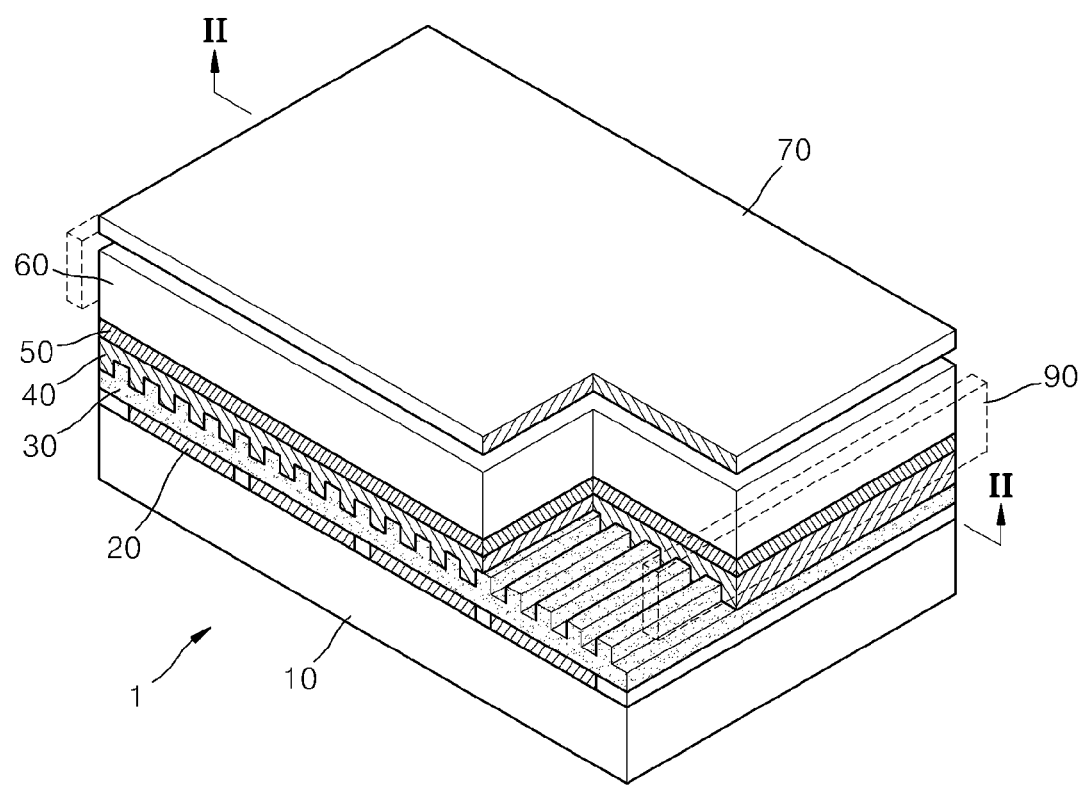
FIG. 1 is a perspective view of a portion of a backlight unit according to an exemplary embodiment.

DETAILED DESCRIPTION OF THE
EXEMPLARY EMBODIMENTS

A reconfigurable backlight unit according to an exemplary embodiment includes a combination of liquid crystal panel technology and light guide plate technology. Hereinafter, a backlight unit and a display apparatus employing the same according to an exemplary embodiment will be described in detail with reference to the attached drawings. In the drawings, like reference numerals denote like elements and the sizes or thicknesses of elements may be exaggerated for clarity of explanation. Also, various changes in form and details may be made in the following exemplary embodiments.

Figure 2:
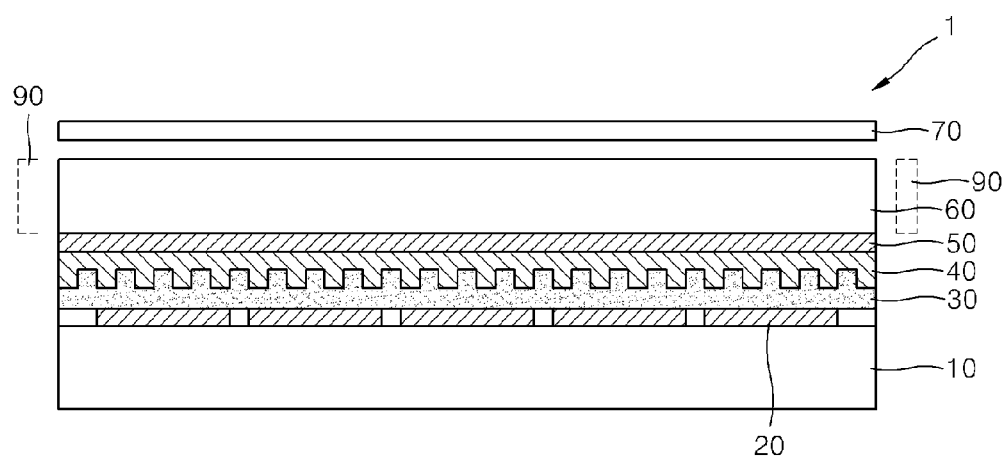
FIG. 2 is a cross-sectional view cut along a line II-II of FIG. 1.
Figure 3:
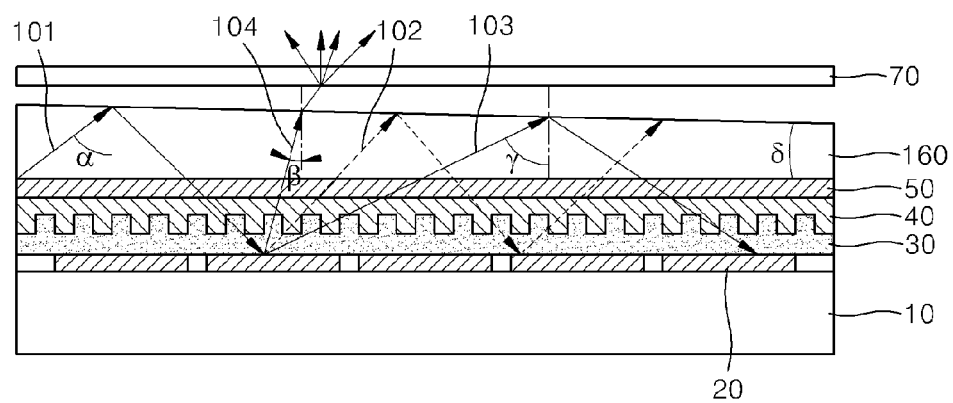
FIG. 3 is a cross-sectional view of an example when a wedge-type substrate substitutes a first substrate illustrated in FIGS. 1 and 2.

FIG. 1 is a perspective view of a portion of a backlight unit according to an exemplary embodiment. FIG. 2 is a cross-sectional view cut along a line II-II of FIG. 1. FIG. 3 is a cross-sectional view of an example when a wedge-type substrate substitutes a first substrate illustrated in FIGS. 1 and 2.

Referring to FIGS. 1 and 2, the backlight unit includes a light source 90 and a liquid crystal panel 1 for electrically controlling a liquid crystal grating and forming a desired light pattern by using light incident from the light source 90. The backlight unit may further include a diffuser 70 for providing a uniform angle of illumination to light emitted from the liquid crystal panel 1. The liquid crystal panel 1 includes first and second substrates 60 and 10 and a liquid crystal layer 30 disposed between the two substrates, and the light source 90 may be disposed at at least one side of one of the first and second substrates 60 and 10 of the liquid crystal panel 1, which is used as a light guide plate.

The light source 90 may be a cold cathode fluorescent lamp (CCFL) or an LED array, and extends to cover at least one side of the liquid crystal panel 1. In FIGS. 1 and 2, the light source 90 is disposed at two opposite sides of the liquid crystal panel 1.

A transparent film 40 formed on one of the first and second substrates 60 and 10 to contact the liquid crystal layer 30.

The first substrate 60 may be used as a light guide plate for guiding light incident from the light source 90 disposed at at least one side of the first substrate 60. A transparent electrode 50 is disposed on one surface, e.g., an internal surface, of the first substrate 60 facing the liquid crystal layer 30. The first substrate 60 is transparent may be formed of optical glass or a polymer such as polymethylmethacrylate (PMMA) or polycarbonate. The light source 90 may be bonded to an edge of the first substrate 60. A light-emitting surface of the first substrate 60, i.e., a surface opposite to a surface on which the transparent electrode 50 is formed, which is a surface through which light is emitted from the liquid crystal panel 1, may be flat and polished. The transparent electrode 50 may be formed of indium tin-oxide (ITO).

As illustrated in FIGS. 1 and 2, the first substrate 60 may have a uniform thickness. Also, as illustrated in FIG. 3, the backlight unit may include the wedge-type first substrate 160 having a gradually decreasing or increasing thickness.

Figure 5:
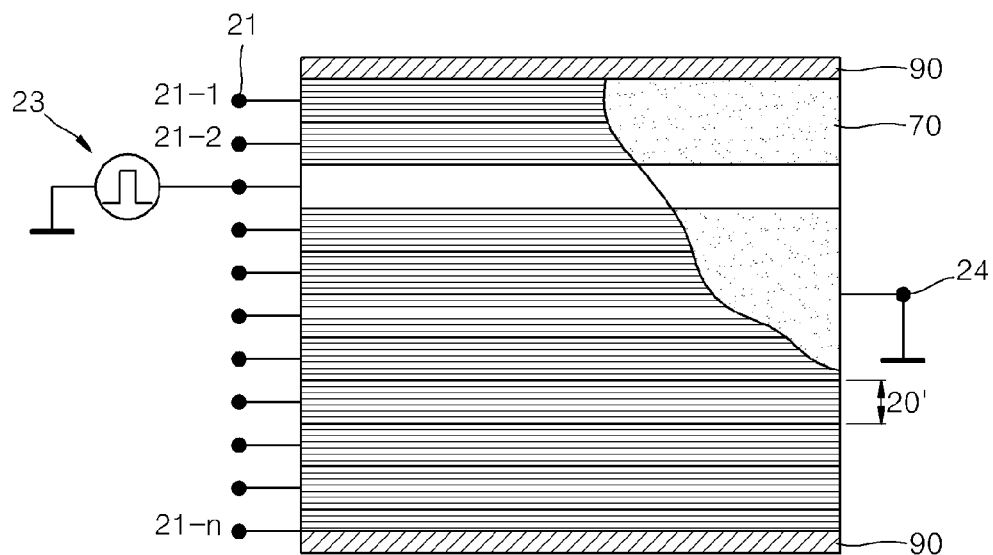
FIG. 5 is a schematic view of an electrode structure for realizing backlight scanning in a backlight unit, according to an exemplary embodiment.

A reflective electrode 20 is disposed on a surface of the second substrate 10 facing the transparent electrode 50 of the first substrate 60. The reflective electrode 20 may be formed of a material having a high reflectance of visual light to function as a mirror. For example, the reflective electrode 20 may be formed of a material having an excellent reflectance, such as, aluminum. The structure of the reflective electrode 20 or the transparent electrode 50 may be defined according to an application of a display panel. For example, if the backlight unit according to an exemplary embodiment is a scanning backlight for reducing motion blur, the reflective electrode 20 may be in the form of a plurality of stripes aligned at equal intervals as illustrated in FIG. 5 to be described below.

Since the backlight unit according to an exemplary embodiment is configured such that light does not pass through the second substrate 10, an opaque substrate may be used as the second substrate 10, or a transparent substrate may also be used as the second substrate 10.

The transparent film 40 may be formed on one of the first and second substrates 60 and 10 to contact the liquid crystal layer 30. In FIGS. 1 through 3, the transparent film 40 is formed on the first substrate 60. The transparent film 40 may be bonded onto the transparent electrode 50 formed on one surface of the first substrate 60. Grooves or ribs aligned in parallel with a direction in which the light source 90 extends are patterned on a surface of the transparent film 40 contacting the liquid crystal layer 30. The transparent film 40 is formed to have a refractive index corresponding to at least one of an ordinary refractive index no and an extraordinary refractive index ne of liquid crystals of the liquid crystal layer 30. Here, the refractive index corresponding to the ordinary refractive index no or the extraordinary refractive index ne of the liquid crystals refers to a refractive index identical or similar to the ordinary refractive index no or the extraordinary refractive index ne of the liquid crystals.

The grooves of the transparent film 40 may be uniformly or arbitrarily aligned. The grooves of the transparent film 40, which extend in the same direction as the light source 90, may have a simple cross-section such as a triangular, rectangular, trapezoidal, or semicircular, or a more complicated cross-section. In FIGS. 1 through 3, the grooves have a rectangular cross-section. The grooves or ribs of the transparent film 40 may be formed by performing a molding, an etching, a depositing, or a cutting process, or another appropriate process.

The transparent film 40 may be formed of a transparent birefringent material having an ordinary refractive index no' and an extraordinary refractive index ne' corresponding to the ordinary refractive index no and the extraordinary refractive index ne of the liquid crystals of the liquid crystal layer 30. For example, the transparent film 40 may be a polymerized liquid crystal film.

Alternatively, the transparent film 40 may be formed of an optically isotropic material such as PMMA or polycarbonate having a refractive index similar to the ordinary refractive index no or the extraordinary refractive index ne of the liquid crystals of the liquid crystal layer 30.

Since the grooves or ribs are patterned on one surface of the transparent film 40 and the patterned surface of the transparent film 40 contacts the liquid crystal layer 30, the liquid crystal layer 30 has a periodically variable thickness according to the pattern of the transparent film 40 and thus has a liquid crystal grating corresponding to the groove pattern of the transparent film 40 on the surface contacting the transparent film 40.

Accordingly, if the transparent film 40 and the liquid crystal layer 30 have different refractive indices, light is refracted at a boundary of the transparent film 40 and the liquid crystal layer 30 and thus the liquid crystal layer 30 functions as a liquid crystal grating. Otherwise, if the transparent film 40 and the liquid crystal layer 30 have identical or similar refractive indices, light passes through the boundary of the transparent film 40 and the liquid crystal layer 30 without being refracted therebetween and thus the liquid crystal layer 30 does not function as a liquid crystal grating.

As such, the refractive indices of the liquid crystal layer 30 and the transparent film 40 may match or not match according to whether a voltage is applied between the transparent electrode 50 and the reflective electrode 20, such that the liquid crystal panel 1 forms an electrically controllable liquid crystal grating. Accordingly, a desired light pattern may be formed by electrically controlling the liquid crystal grating.

Operation of the backlight unit is described as follows with reference to optical paths illustrated in FIG. 3.

Light 101 incident from the light source 90 on a side surface of the wedge-type first substrate 160 functioning as a light guide plate is sequentially reflected on an upper surface of the wedge-type first substrate 160 and on the reflective electrode 20 by internal total reflection so as to propagate in the wedge-type first substrate 160. Liquid crystals are an electro-optical material having a refractive index dependent upon an applied voltage due to realignment of molecules according to an applied electric field. For example, it is assumed that the refractive index of the liquid crystals of the liquid crystal layer 30 matches the refractive index of the transparent film 40 when a voltage is applied between the transparent electrode 50 and the reflective electrode 20. In this case, the incident light 101 passes through the transparent electrode 50, the patterned transparent film 40, and the liquid crystal layer 30 without interruption, and then proceeds as light 102 indicated by dashed arrows.

If the voltage is removed from the reflective electrode 20, the refractive index of the liquid crystal layer 30 on the reflective electrode 20 does not match the refractive index of the transparent film 40 any more, the incident light 101 is diffracted or refracted to light 102, 103, and 104. From among them, the light 104 incident on the upper surface of the wedge-type first substrate 160 with an angle less than the angle of internal total reflection passes through the upper surface of the wedge-type first substrate 160. FIG. 3 shows an example when the incident light 101 is diffracted into 0th diffraction light 102 (having a same optical path as that when the incident light 101 is not diffracted nor refracted), and +1st diffraction light 103 and −1st diffraction light 104 which are incident on the upper surface of the wedge-type first substrate 160 respectively with angles greater and less than the angle of internal total reflection. When the grooves of the transparent film 40 have a small pitch, diffraction light has a large diffraction angle.

For example, it is assumed that the light 101 is incident on the upper surface of the wedge-type first substrate 160 with an angle α slightly greater than the angle of internal total reflection. The light 101 is diffracted into light 103 and 104 having optical paths different from the optical path of the light 101. The light 104 is incident on the upper surface of the wedge-type first substrate 160 with an angle β less than the angle of internal total reflection, passes through the upper surface to be externally emitted, and is diffused by the diffuser 70. The light 103 is incident on the upper surface of the wedge-type first substrate 160 with an angle γ greater than the angle α and propagates in the wedge-type first substrate 160. In FIG. 3, δ denotes a wedge angle of the wedge-type first substrate 160.

In this case, the refractive index of the liquid crystal layer 30 may be controlled by an applied voltage, the intensity of the emitted light 104 and the intensities of the light 102 and 103 that propagate in the wedge-type first substrate 160, i.e., a light guide plate, may be controlled by the applied voltage.

According to the above-described backlight unit, a liquid crystal grating may be formed according to whether refractive indices of the liquid crystal layer 30 and the transparent film 40 match based on whether a voltage is applied between the transparent electrode 50 and the reflective electrode 20, and the liquid crystal grating may be electrically controlled to illuminate a desired light pattern by using light incident from the light source 90.

Figure 4A:
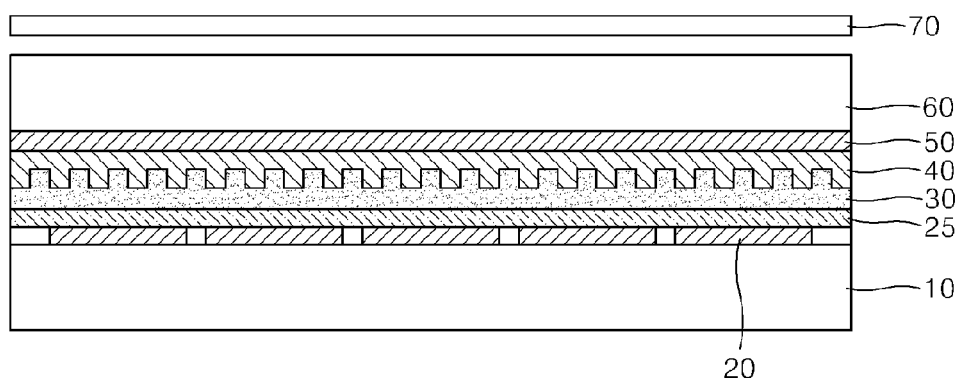
FIGS. 4A and 4B are cross-sectional views of a backlight unit according to another exemplary embodiment.
Figure 4B:
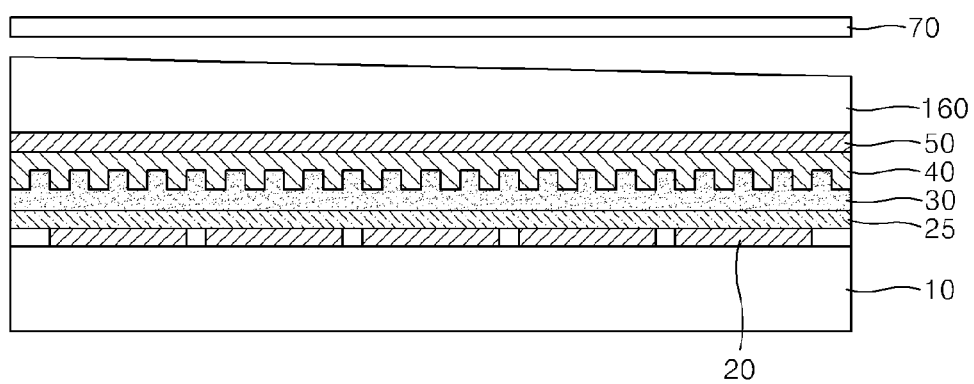

Since only an extraordinary refractive index of liquid crystals of the liquid crystal layer 30 may be controlled according to an applied voltage, in order to more uniformly couple two polarization components, i.e., s and p polarization components, the backlight unit may further include a transparent optical retarding film 25 on the reflective electrode 20, as illustrated in FIGS. 4A and 4B. FIG. 4A shows an example when the backlight unit illustrated in FIGS. 1 and 2 further includes the transparent optical retarding film 25. FIG. 4B shows an example when the backlight unit illustrated in FIG. 3 further includes the transparent optical retarding film 25.

Also, a light pattern generated by the backlight unit according to an exemplary embodiment may vary according to an electrode pattern and an applied driving signal. If necessary, the backlight unit according to an exemplary embodiment may provide uniform illumination, and blur may be controlled according to the distance between the liquid crystal panel 1 and the diffuser 70.

FIG. 5 is a schematic view of an electrode structure for performing backlight scanning in a backlight unit, according to an exemplary embodiment.

In order to perform backlight scanning, the electrode structure may be in the form of a plurality of stripes aligned at equal intervals as illustrated in FIG. 5. FIG. 5 shows an example when the light source 90 extends along an edge of the substrate 60 in a horizontal direction, grooves of the transparent film 40 also extend along the light source 90 in a horizontal direction, and the electrode structure is in the form of horizontally aligned stripes in correspondence with the grooves. Alternatively, the light source 90 and the grooves of the transparent film 40 may extend in a vertical direction, and the electrode structure may be in the form of horizontally aligned stripes. In FIG. 5, a reference numeral 20' denotes one address electrode region.

If backlight scanning is performed as illustrated in FIG. 5, the transparent electrode 50 and a terminal 24 may be used as a common electrode, and the reflective electrode 20 and a terminal 21 may be used as an address electrode. In this case, a driving signal generator 23 may be connected sequentially to address electrodes 21-1 through 21-N in synchronization with scanning of lines of a display panel so as to reduce motion blur. FIG. 5 shows an example when the driving signal generator 23 is connected to the address electrode 21-3.

Alternatively, the transparent electrode 50 may be used as an address electrode, and the reflective electrode 20 may be used as a common electrode.

According to the above-described backlight unit, one of the transparent electrode 50 and the reflective electrode 20 may have a structure configured in the form of a plurality of stripes so as to be used as address electrodes, and the other of the transparent electrode 50 and the reflective electrode 20 may be used as a common electrode, thereby performing backlight scanning.

Figure 6:
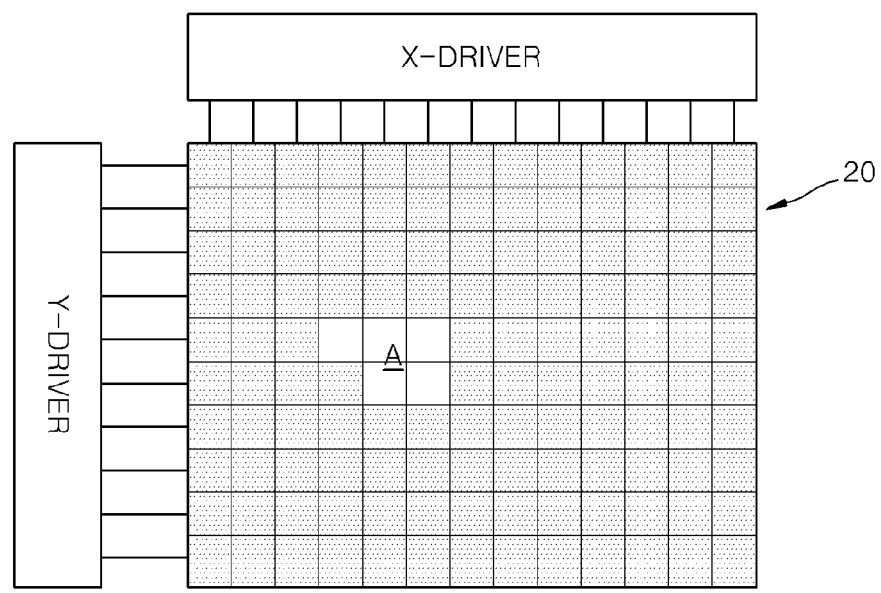
FIG. 6 is a schematic view of an electrode structure for realizing local dimming in a backlight unit, according to an exemplary embodiment.

FIG. 6 is a schematic view of an electrode structure for performing local dimming in a backlight unit, according to an exemplary embodiment.

In order to be applied as a local dimming backlight, the electrode structure may be in the form of a 2D array as illustrated in FIG. 6 so as to perform addressing individually or by using a matrix method. That is, in order to perform as a local dimming backlight, one of the transparent electrode 50 and the reflective electrode 20 may be in the form of a 2D array to be addressed by an X-driver and a Y-driver individually or by using a matrix method, and the other of the transparent electrode 50 and the reflective electrode 20 may be used as a common electrode. FIG. 6 shows an example when a region "A" is locally dimmed by the X-driver and the Y-driver.

Figure 7:
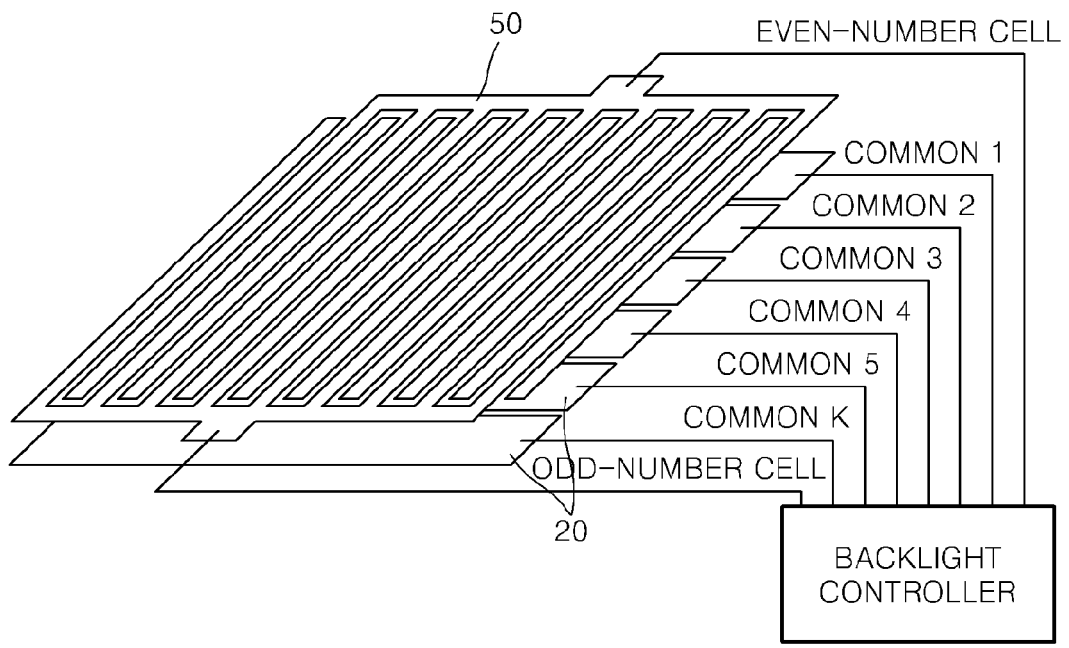
FIG. 7 is a schematic view of an electrode structure of a backlight unit employed in a 2D/3D switchable display apparatus, according to an exemplary embodiment.

FIG. 7 is a schematic view of an electrode structure of a backlight unit employed in a 2D/3D switchable display apparatus, according to another aspect of an exemplary embodiment.

In order to employ the backlight unit in the 2D/3D switchable display apparatus as a generator capable of switching illumination lines, both of the reflective electrode 20 and the transparent electrode 50 may be split as illustrated in FIG. 7. That is, one of the transparent electrode 50 and the reflective electrode 20 may be split in one direction, and the other of the transparent electrode 50 and the reflective electrode 20 may be split in a direction crossing the one of the transparent electrode 50 and the reflective electrode 20, such that the illumination lines may be switched. In FIG. 7, the transparent electrode 50 is formed to have mutually engaged comb-shape, and the reflective electrode 20 is formed to have a plurality of separate stripes.

Figure 8:
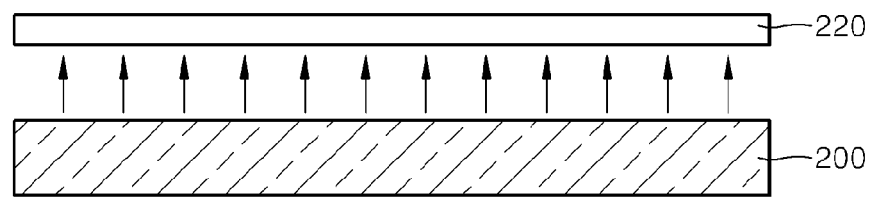
FIG. 8 is a schematic view of a display apparatus employing a backlight unit, according to an exemplary embodiment.

FIG. 8 is a schematic view of a display apparatus employing a backlight unit 200, according to an exemplary embodiment.

Referring to FIG. 8, the display apparatus includes the backlight unit 200 and a display panel 220 formed on the backlight unit 200 so as to form an image. The backlight unit 200 may be the backlight unit of embodiments previously described.

The display panel 220 may include, for example, a liquid crystal panel. In the liquid crystal panel, a thin film transistor (TFT) and electrodes are included in every pixel and thus an electric field may be applied to liquid crystals so as to form an image. A configuration of the liquid crystal panel 1 and its circuit driving method to display an image are well known and thus are not described here.

While a few exemplary embodiments have been particularly shown and described, it will be understood by those of ordinary skill in the art that various changes in form and details may be made therein without departing from the spirit and scope of the inventive concept as defined by the following claims.

What is claimed is:

1. A backlight unit comprising:
a light source; and
a liquid crystal panel which electrically controls a liquid crystal grating and forms a desired light pattern by using light incident from the light source,
wherein the liquid crystal panel comprises:
a first substrate which guides the light incident from the light source disposed at at least one side of the first substrate;
a transparent electrode disposed on a surface of the first substrate;
a second substrate;
a reflective electrode disposed on a surface of the second substrate facing the transparent electrode disposed on the first substrate;
a liquid crystal layer disposed between the transparent electrode and the reflective electrode; and
a transparent film disposed between the transparent electrode and the reflective electrode, the transparent film comprising a surface contacting the liquid crystal layer and patterned with grooves or ribs extending in parallel with a direction in which the light source extends, and the transparent film having a refractive index corresponding to at least one of an ordinary refractive index and an extraordinary refractive index of liquid crystals of the liquid crystal layer,
wherein the liquid crystal layer and the transparent film form the liquid crystal grating according to whether refractive indices of the liquid crystal layer and the transparent film match based on a voltage applied between the transparent electrode and the reflective electrode, and
wherein the liquid crystal grating is electrically controlled to form the desired light pattern.

2. The backlight unit of claim 1, wherein the transparent film is bonded onto the transparent electrode.

3. The backlight unit of claim 1, wherein the first substrate has a uniform thickness, or has a wedge shape which gradually increases or decreases in thickness.

4. The backlight unit of claim 1, wherein the transparent film comprises a transparent birefringent material having an ordinary refractive index and an extraordinary refractive index corresponding to the ordinary refractive index and the extraordinary refractive index of the liquid crystals of the liquid crystal layer.

5. The backlight unit of claim 4, wherein the transparent film comprises a polymerized liquid crystal film.

6. The backlight unit of claim 1, wherein the transparent film comprises an isotropic material having a refractive index corresponding to one of the ordinary refractive index and the extraordinary refractive index of the liquid crystals of the liquid crystal layer.

7. The backlight unit of claim 6, wherein the transparent film comprises polymethylmethacrylate (PMMA) or polycarbonate.

8. The backlight unit of claim 1, further comprising a transparent optical retarding film disposed between the reflective electrode and the transparent electrode.

9. The backlight unit of claim 1, further comprising a diffuser disposed at a light-emitting surface side of the liquid crystal panel.

10. The backlight unit of claim 1, wherein one of the transparent electrode and the reflective electrode is an address electrode and comprises horizontally aligned stripes, and the other one of the transparent electrode and the reflective electrode is a common electrode.

11. The backlight unit of claim 1, wherein one of the transparent electrode and the reflective electrode has a structure of a two-dimensional (2D) array which is individually addressed or addressed using a matrix method, and the other one of the transparent electrode and the reflective electrode is a common electrode.

12. The backlight unit of claim 1, wherein one of the transparent electrode and the reflective electrode is split in a first direction, and the other one of the transparent electrode and the reflective electrode is split in a second direction crossing the one of the transparent electrode and the reflective electrode.

13. The backlight unit of claim 1, wherein the grooves of the transparent film have a rectangular cross-section.

14. A display apparatus comprising:
   the backlight unit of claim 1; and
   a display panel which forms an image by using light emitted from the backlight unit.

15. The display apparatus of claim 14, wherein one of the transparent electrode and the reflective electrode of the backlight unit is an address electrode and comprises horizontally aligned stripes, and the other one of the transparent electrode and the reflective electrode is a common electrode.

16. The display apparatus of claim 14, wherein one of the transparent electrode and the reflective electrode of the backlight unit has a structure of a two-dimensional (2D) array which is individually addressed or which is addressed using a matrix method, and the other one of the transparent electrode and the reflective electrode is a common electrode.

17. The display apparatus of claim 14, wherein one of a transparent electrode and a reflective electrode of the backlight unit is split in a first direction, and the other one of the transparent electrode and the reflective electrode is split in a second direction crossing the one of the transparent electrode and the reflective electrode.

18. A liquid crystal panel which electrically controls a liquid crystal grating and forms a desired light pattern by controlling light incident from an external light source, the liquid crystal panel comprising:
   a first substrate which guides the light incident from the external light source;
   a second substrate;
   a transparent electrode disposed on an inner side surface of the first substrate;
   a reflective electrode disposed on an inner side surface of the second substrate;
   a transparent film disposed on an inner side surface of the transparent electrode; and
   a liquid crystal layer disposed between the transparent film and the reflective electrode,
   wherein the transparent film is patterned with grooves extending in a direction parallel to the external light source, and the transparent film has a refractive index corresponding to at least one of an ordinary refractive index and an extraordinary refractive index of liquid crystals of the liquid crystal layer, and when a voltage is applied between the transparent electrode and the reflective layer, the liquid crystal grating is controlled.

19. The liquid crystal panel of claim 18, wherein the first substrate has a uniform thickness, or has a wedge shape gradually increasing or decreasing thickness.

20. The liquid crystal panel of claim 18, wherein the transparent film comprises a transparent birefringent material having an ordinary refractive index and an extraordinary refractive index corresponding to the ordinary refractive index and the extraordinary refractive index of the liquid crystals of the liquid crystal layer.

* * * * *